United States Patent
Pergande et al.

[11] Patent Number: 5,967,218
[45] Date of Patent: Oct. 19, 1999

[54] METHOD OF INTEGRATING DETAILED FEATURES INTO A SPRAY FORMED RAPID TOOL

[75] Inventors: Paul E. Pergande, Beverly Hills; Jeffrey A. Kinane, Birmingham; David R. Collins, Southgate, all of Mich.; Jim Welniak, Rossford, Ohio

[73] Assignee: Ford Motor Company, Dearborn, Mich.

[21] Appl. No.: 09/110,290

[22] Filed: Jul. 6, 1998

[51] Int. Cl.⁶ .......................... B22D 23/00; B22D 19/00; B22C 9/04
[52] U.S. Cl. .................. 164/46; 164/98; 164/34; 164/516
[58] Field of Search .................. 164/46, 98, 34, 164/516

[56] References Cited

U.S. PATENT DOCUMENTS

| | | |
|---|---|---|
| 4,726,412 | 2/1988 | Magnan et al. . |
| 5,100,355 | 3/1992 | Marcus et al. . |
| 5,189,781 | 3/1993 | Weiss et al. . |
| 5,228,493 | 7/1993 | Siemers et al. . |
| 5,257,657 | 11/1993 | Gore . |
| 5,337,631 | 8/1994 | Singer et al. . |
| 5,372,176 | 12/1994 | Brown et al. ............... 164/34 |
| 5,433,002 | 7/1995 | Nadolink . |
| 5,658,506 | 8/1997 | White et al. ............... 264/28 |

FOREIGN PATENT DOCUMENTS

| | | | |
|---|---|---|---|
| 4236084 | 4/1994 | Germany ............... | 164/98 |
| 9519859 | 7/1995 | WIPO . | |

*Primary Examiner*—Harold Y. Pyon
*Assistant Examiner*—I. -H. Lin
*Attorney, Agent, or Firm*—Lorraine S. Melotik

[57] ABSTRACT

A method of integrating detailed features into a spray formed rapid tool includes the steps of making a model of a desired tool and constructing a ceramic pattern as the inverse of the model. The method also includes the steps of locating at least one detailed feature insert on the ceramic pattern and thermally spraying metal material against the detailed feature insert and ceramic pattern to form the desired tool and embedding the detailed feature insert into the desired tool.

9 Claims, 2 Drawing Sheets

METHOD OF INTEGRATING DETAILED FEATURES INTO A SPRAY FORMED RAPID TOOL

BACKGROUND OF THE INVENTION

1. Field of the Invention

The present invention relates generally to spray formed rapid tools and, more specifically, to a method of integrating detailed features into a spray formed rapid tool

2. Description of the Related Art

It is known to make a spray formed rapid tool. In spray forming, a master model of a desired tool is produced using a free form fabrication technique. This master model is then used to create a ceramic pattern which is the reverse of the desired tool to be produced. The resulting ceramic pattern is the receptor onto which metal is sprayed to form a deposit in the shape of the desired tool.

Typically, the spray forming process uses a wire-arc spraying. In wire-arc spraying, electric current is carried by two electrically conductive, consumable wires with an electric arc forming between the wire tips. A high-velocity gas jet blowing from behind the consumable wires strips away the molten metal which continuously forms as the wires are melted by the electric arc. The high-velocity gas jet breaks up or atomizes the molten metal into finer particles in order to create a fine distribution of molten metal droplets. The atomizing gas then accelerates the droplets away from the wire tips to the ceramic pattern where the molten metal droplets impact the ceramic pattern to incrementally form a deposit in the shape of the desired tool. The completed desired tool is then mounted and used to produce parts in conventional stamping, die casting, or molding process.

The formation of a totally functional spray formed rapid tool depends upon the incorporation of many subtle design and functional features. These details can be very fine or small as well as embedded on the surface or at some depth in the desired tool.

Finely detailed features which are embedded at some depth require a very thick deposit to properly anchor the features. It is also problematic to spray around deeply embedded features which are "hidden" because voids can result. Formation of voids is due to limitations of the spray and the wide spray pattern of the typical thermal spray process. In addition, thermal spray particles are not self leveling and therefore do not fill voids. These voids may become crack or stress initiation sites of the desired tool.

Detailed features which can cause voids in spray formed rapid tools are grouped into two categories as thin/deep and blind. A thin/deep detailed feature has an opening that is too narrow and thus prevents spray steam particles from penetrating to the bottom of the feature in the ceramic pattern. Typical aspect ratios for a thin/deep detailed feature are greater than 1:1 depth: smallest opening dimension. Common examples of thin/deep detailed features include stiffening ribs and baffles. A thin/deep detailed feature is long and has a depth that is greater than the narrowest width dimension. A blind feature may also be small but it is deep relative to width of its opening. Typically, the aspect ratio between its depth and smallest opening dimension is greater than 1:1. For instance, a feature with a hole 0.25" wide and 0.50" deep has a 2:1 aspect ratio, thus making it difficult to fill with spray stream particles.

Although the above process for making a spray formed rapid tool has worked well, it suffers from the disadvantage that very fine and deeply embedded detailed features must be machined into the spray formed rapid tool after the spray process is completed. This machining process is both laborious and time consuming. Another disadvantage is that the thermal spray coatings are heavily oxidized and the detailed features can only be ground or electro discharge machined (EDM) into the spray formed rapid tool which is time consuming because the electrodes must be as finely detailed as the detailed features and is costly. Therefore, there is a need in the art to integrate detailed features in a spray formed rapid tool that would otherwise need to be machined into the tool.

SUMMARY OF THE INVENTION

Accordingly, the present invention is a method of integrating detailed features into a spray formed rapid tool. The method includes the steps of making a model of a desired tool and constructing a ceramic pattern as the inverse of the model. The method also includes the steps of locating at least one detailed feature insert on the ceramic pattern. The method further includes the steps of thermally spraying a metal material against the detailed feature insert and ceramic pattern to form the desired tool and embedding the detailed feature insert into the desired tool.

One advantage of the present invention is that a method is provided of integrating prefabricated cast or wrought machined detailed feature insert into a spray formed rapid tool at the same time the spray material is being deposited. Another advantage of the present invention is that the integration of detailed features in a spray formed rapid tool shortens product development cycle time. Yet another advantage of the present invention is that the detailed feature insert has a level of detail that cannot be created using the spray formed deposit. Still another advantage of the present invention is that the method allows the integration of very fine and deeply embedded detailed features into a spray formed rapid tool and eliminates secondary machining processes of the thermal spray material. A further advantage of the present invention is that the method reduces material loss. Yet a further advantage of the present invention is that the method improves yield, quality and repeatability.

Other features and advantages of the present invention will be readily appreciated as the same becomes better understood after reading the subsequent description taken in conjunction with the accompanying drawings.

DESCRIPTION OF THE PREFERRED EMBODIMENT(S)

Figure 1A:
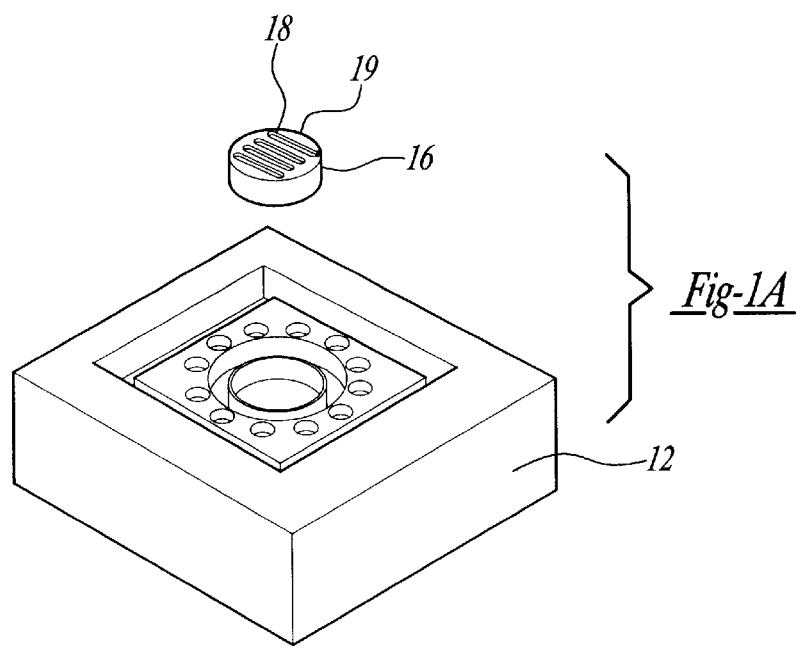
FIGS. 1A, 1B, 1C, 1D and 1E are a schematic flow diagram of a method of integrating detailed features into a spray formed rapid tool according to the present invention.
Figure 1B:
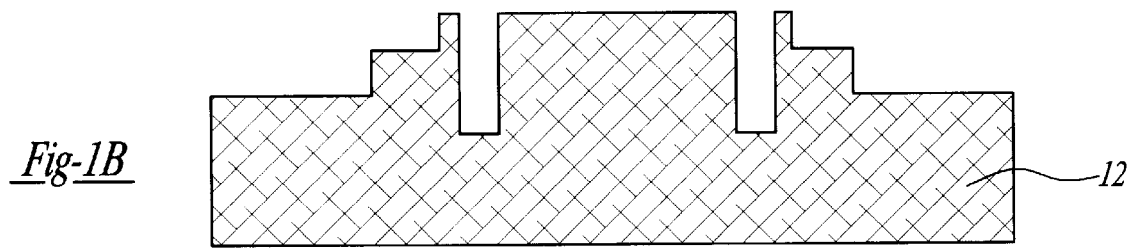

Referring to the drawings and in particular FIGS. 1A through 1E, one embodiment of a method of integrating detailed features into a spray formed rapid tool, according to the present invention, is shown. The method begins by creating or making a master model 12 of a desired tool as illustrated in FIGS. 1A and 1B. Typically, the master model 12 may be produced by using a CAD/CAM design and a free-form fabrication system such as stereolithography. Such a process is disclosed in U.S. Pat. No. 5,658,506 to White et al., the disclosure of which is hereby incorporated by reference.

Figure 1C:
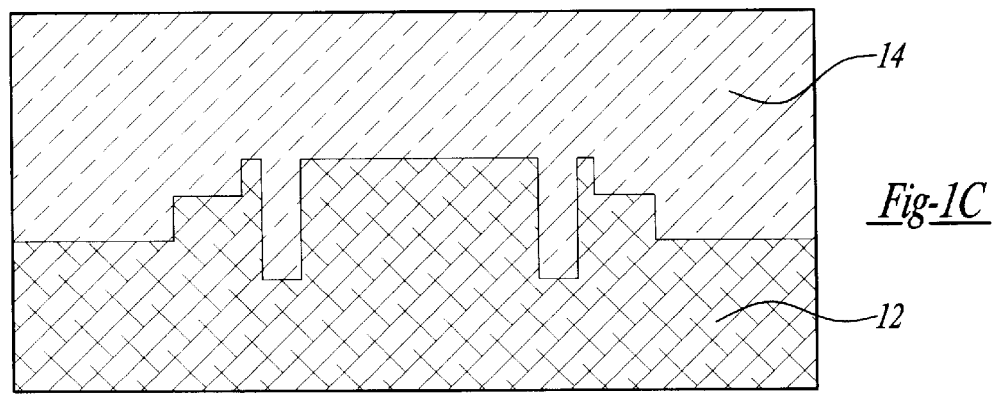

The method also includes the step of constructing a ceramic pattern 14 as the inverse of the master model 12 as illustrated in FIG. 1C. To create the ceramic pattern 14, the bottom of the master model 12 is adhered to a base plate (not shown) of an open box (not shown); the box is open at its top. A desired ceramic slurry is poured around the master model 12 to form the ceramic pattern 14 and completely covers its geometry to a thickness of greater than one (1) inch at the thinnest wall section. Entrapped air is minimized by vibrating the box and slurry contained therein on a table (not shown), preferably in a vacuum chamber (not shown). Depending on the character of the ceramic slurry that is employed, the ceramic pattern 14 is either (i) air dried, removed and then fired to finally cure it, or (ii) the ceramic slurry is freeze cast to temperatures around −30° F. and the master model 12 removed prior to the ceramic pattern 14 thawing out, or (iii) the ceramic slurry is dried and, then the master model 12 burned out while the ceramic pattern 14 is undergoing curing. The latter is conventional investment casting and is not desirable because of the possibility of shell cracking, lower shell strength and poor geometric comparability with the spray process. Freeze casting is preferred.

The master model 12 is removed from the cured ceramic pattern 14 by installing screws (not shown) in the back of the master model 12 and pulling the master model 12 out physically. Alternatively, a stationary plate (not shown) may be used through which the extraction screws extend and the master model 12 is removed by turning the screws inward to pull against the stationary plate and also pull the master model 12 away from the ceramic pattern 14.

The ceramic material for the ceramic pattern 14 is selected to provide a good surface finish (such as 1–4 microns), good thermal shock resistance value at temperatures of1800°–2400° F., able to withstand up to 2400° F. temperatures, have compressive strengths of about 9,000 psi and possess a low shrinkage (less than 0.3 percent) and possess low thermal expansion (1.0–4.0 E6/degree F.) and have no reaction to molten metal. The ceramic material is selected to be capable of withstanding a molten metal environment and have a very smooth surface with good dimensional accuracy. The ceramic materials used include aluminum oxide ceramics, dental ceramics, investment casting slurries, fused silica and freeze cast alumina.

Figure 1D:
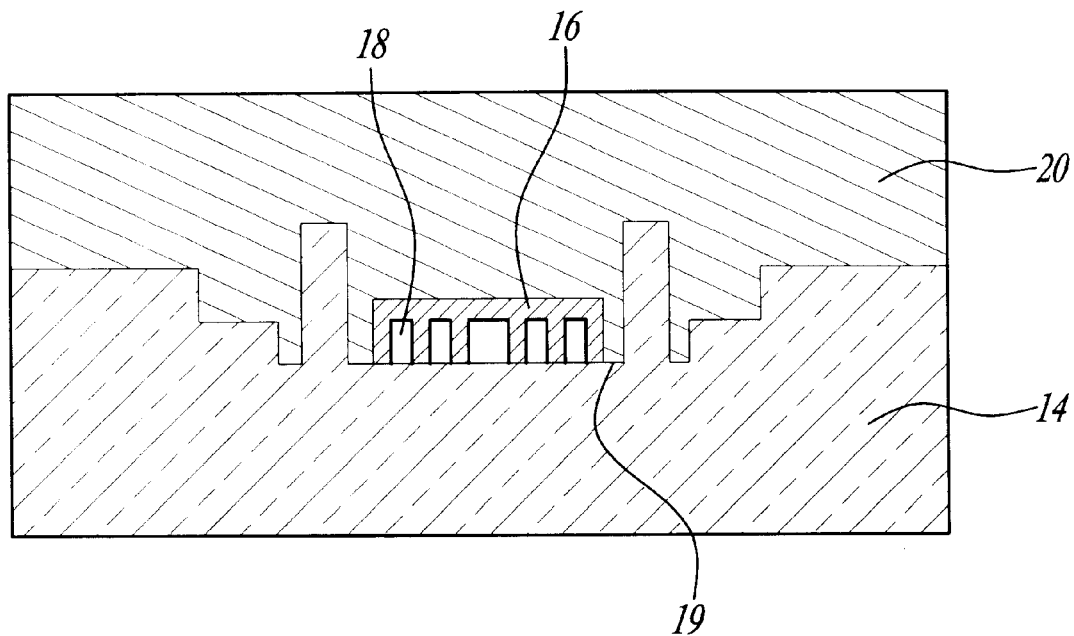

Referring to FIG. 1D, the method includes the step of locating at least one detailed feature insert 16 on the ceramic pattern 14. The detailed feature insert 16 has at least one detailed feature 18 as previously defined. Specifically, the detailed feature insert 16 is inverted such that a contact surface 19 rests against the ceramic pattern 14 and is partially embedded in the ceramic pattern 14 to locate the detailed feature insert 16 prior to the application of thermal spray. The detailed feature insert 16 may be pinned in place on the ceramic pattern 14 by pins (not shown). The detailed feature insert 16 and ceramic pattern 14 may be preheated before the insert 16 is located on the ceramic pattern 14 to improve adhesion between the thermal spray material and the insert 16 and ceramic pattern 14. The detailed feature insert 16 is made of a metal material such as steel or aluminum as a prefabricated cast or wrought machined. The detailed feature insert 16 may have its surfaces to which the thermal spray is intended to adhere roughened or grit blasted to improve adhesion of the spray material. It should be appreciated that, if the desired tool requires many inserts 16, they can be combined into a master insert.

Figure 1E:
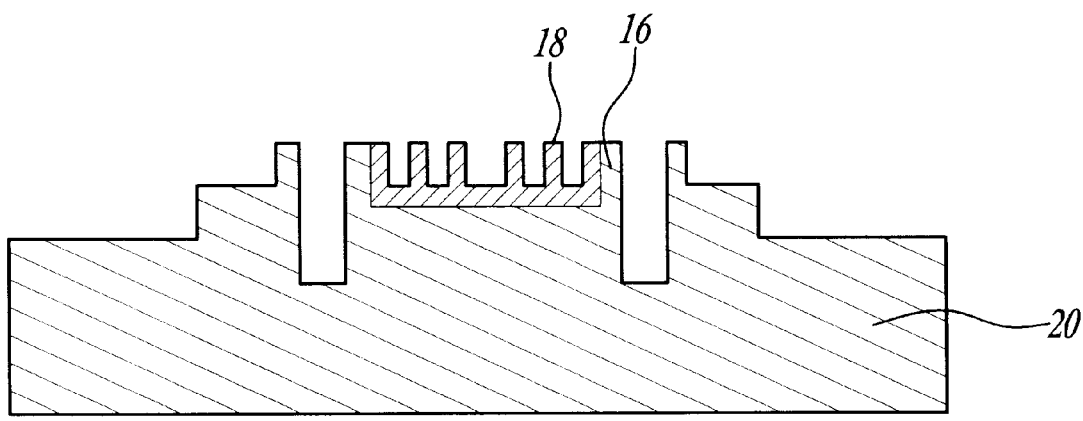

The method includes the step of thermally spraying a metal material against the detailed feature insert 16 and ceramic pattern 14 to form a spray formed rapid tool 20 as the desired tool and embed the detailed feature insert 16 into the spray formed rapid tool 20. Such step is desirably carried out by the wire arc process previously described. Another method to carry out the step of thermally spraying is the osprey process wherein a semi-solid slurry of hardenable metal material is sprayed from an induction heated nozzle supply and is impelled against the ceramic pattern 14 and detailed feature insert 16 with a high velocity due to the high pressure gases that atomize the molten fluid. Metal droplets are formed from a melt that is atomized by gas (not from wire or powder). Continuous spraying is carried out to build up a layer that exceeds at least one quarter (¼) inch in thickness, at its thinnest section. As the spray is applied and built up, the detailed feature insert 16 becomes embedded in the deposit as illustrated in FIGS. 1D and 1E.

Metals usable for this purpose include metals such as zinc and high temperature high strength carbon steel. These include certain tool steels such as A2 and plain carbon steel with (0.8% carbon by weight) as well as maraging steels. Maraging steels are difficult to machine and are seldom used for tooling, but can be readily spray formed to produce a desirable microstructure.

The density of the sprayed metal in accordance with this invention, will vary depending on the spray process used, but is generally between 95–99.5%. If the spray formed rapid tool 20 is made by the osprey process, the density will be 99.5% and if it is made by an arc spraying process such as twin arc, the density will be about 95%. The osprey process provides virtually no porosity in the as deposited metal because of the use of a semi-solid slurry that constantly feeds the solidifying metal material. The spraying process will result in little or no shrinkage because of such continuous feeding of deposited material. The osprey spraying process results in a finer microstructure.

Once the spray formed rapid tool 20 is formed, the ceramic pattern 14 is removed by chipping, grit blasting, or using a water jet. The completed spray formed rapid tool 20 may then be used in a die-set mold mounted in an injection molding machine (not shown) and used to produce molded parts.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A method of integrating detailed features into a spray formed rapid tool comprising the steps of:

making a model of a desired tool;

constructing a ceramic pattern as the inverse of the model;

locating at least one detailed feature insert on the ceramic pattern; and thermally spraying a metal material against the detailed feature insert and ceramic pattern to form a desired tool and embedding the detailed feature insert into the desired tool.

2. A method as set forth in claim 1 including the step of separating the ceramic pattern from the model.

3. A method as set forth in claim 1 including the step of separating the ceramic pattern from the desired tool.

4. A method as set forth in claim 1 including the step of providing a prefabricated cast or wrought detailed feature insert.

5. A method of integrating detailed features into a spray formed rapid tool comprising the steps of:

making a model of a desired tool;

constructing a ceramic pattern as the inverse of the model;

separating the ceramic pattern from the model;

locating at least one insert having a detailed feature on the ceramic pattern;

thermally spraying a metal material against the insert and ceramic pattern to form a desired tool and embedding the insert into the desired tool; and separating the ceramic pattern from the desired tool.

6. A method as set forth in claim 5 including the step of providing a prefabricated cast or wrought insert.

7. A method of integrating detailed features into a spray formed rapid tool comprising the steps of:

making a model of a desired tool;

constructing a ceramic pattern as the inverse of the model;

locating at least one prefabricated cast or wrought machined insert having at least one detailed feature on the ceramic pattern; and thermally spraying a metal material against the insert and ceramic pattern to form a desired tool and embedding the insert into the desired tool.

8. A method as set forth in claim 7 including the step of separating the ceramic pattern from the model.

9. A method as set forth in claim 7 including the step of separating the ceramic pattern from the desired tool.

* * * * *